(12) United States Patent
Simon

(10) Patent No.: US 8,817,140 B2
(45) Date of Patent: Aug. 26, 2014

(54) CAMERA SET-UP AND METHOD FOR ASCERTAINING PICTURE SIGNALS HAVING COLOR VALUES

(75) Inventor: Stephan Simon, Sibbesse (DE)

(73) Assignee: Robert Bosch GmbH, Stuttgart (DE)

( * ) Notice: Subject to any disclaimer, the term of this patent is extended or adjusted under 35 U.S.C. 154(b) by 516 days.

(21) Appl. No.: 12/699,472

(22) Filed: Feb. 3, 2010

(65) Prior Publication Data

US 2010/0214455 A1  Aug. 26, 2010

(30) Foreign Application Priority Data

Feb. 24, 2009  (DE) .......................... 10 2009 001 122

(51) Int. Cl.
*H04N 3/14*  (2006.01)
*H04N 7/00*  (2011.01)
*G06F 7/00*  (2006.01)

(52) U.S. Cl.
USPC .............................. 348/273; 348/113; 701/36

(58) Field of Classification Search
USPC ................. 348/272, 273, 113; 356/218, 121; 382/104; 340/467, 937; 701/36
See application file for complete search history.

(56) References Cited

U.S. PATENT DOCUMENTS

| 6,774,988 B2 * | 8/2004 | Stam et al. ..................... 356/218 |
| 2004/0201483 A1 * | 10/2004 | Stam et al. ..................... 340/600 |
| 2007/0206110 A1 * | 9/2007 | Wada ............................. 348/340 |

FOREIGN PATENT DOCUMENTS

DE  10 2007 040 114  2/2009
JP  2004 304 706  10/2004

* cited by examiner

*Primary Examiner* — Twyler Haskins
*Assistant Examiner* — Akshay Trehan
(74) *Attorney, Agent, or Firm* — Kenyon & Kenyon LLP

(57) ABSTRACT

A method for ascertaining image signals having color values and a camera set-up, which has: a camera having camera optics, an image sensor for recording an environment and for outputting first image signals, and a color mask applied in front of the image sensor, and an evaluation device, which picks up the first image signals emitted by the image sensor, the image sensor having a plurality of sensor pixels and the color mask having a plurality of filter pixels which are each situated in front of the sensor pixels and include first colored filter pixels and transparent filter pixels; and some of the sensor pixels picking up the light via the colored filter pixels and outputting the first color values, and additional sensor pixels picking up the light via the transparent filter pixels and outputting the intensity values. The evaluation device ascertains second color values from the intensity values and the first color values of various sensor pixels, and forms second image signals from the first color values and the second color values.

19 Claims, 4 Drawing Sheets

CAMERA SET-UP AND METHOD FOR ASCERTAINING PICTURE SIGNALS HAVING COLOR VALUES

RELATED APPLICATION INFORMATION

The present application claims priority to and the benefit of German patent application no. 10 2009 001 122.6, which was filed in Germany on Feb. 24, 2009, the disclosure of which is incorporated herein by reference.

FIELD OF THE INVENTION

The present invention relates to a method for ascertaining image signals having color values and a camera set-up.

BACKGROUND INFORMATION

Vehicle cameras are used for representing a vehicle environment on a display and for vehicle assistance functions for gathering information on the vehicle environment.

Monochromic cameras are able to record different brightness values and make possible high-sensitivity resolution. They are used in night vision systems, for example.

For one thing, color cameras make possible a colorful reproduction of the environment, and for another, an evaluation of various color data. Thus, light assistance functions for vehicles are known in which a vehicle camera ascertains whether other traffic participants are located in a relevant region ahead of the vehicle, and, as a function of this ascertainment, the headlights are automatically switched over from high beam to low beam. For this purpose, sensors are generally used having a color mask which makes possible a color differentiation, especially between red and white, so as to be able to recognize the generally red tail lights and the generally white low beam lights and high beam lights of other vehicles, and distinguish them from one another, even weak red lights, for example, being able to be distinguished from white reflections from other objects.

Such color masks in front of imager sensors and imager chips consequently make possible that different color data are able to be gathered on adjacent pixels. The sensor pixels, in this instance, each supply a scalar value, which, for instance, may be a color value such as R, G, or B, or in the case of a transparent filter pixel, even an intensity value. Thus, standard Bayer pattern masks are known in which every other filter pixel of the color mask is green and these green filter pixels are ordered, distributed in an alternating chessboard-like manner over the matrix arrangement of the filter pixels.

In the other matrix positions blue and red filter pixels are situated, lines having green and blue pixels alternating with lines having red and green pixels. This makes possible a complete color differentiation, i.e. an interpretation into the colors red-blue-green. A disadvantage is, however, the reduction in high-sensitivity resolution compared to that of a monochromic image sensor by a factor of 2. In the case of reduced filter masks, some color pixels of this standard Bayer pattern are omitted, so that transparent pixels remain at their place, whereby the high-sensitivity resolution is increased. The color data obtained in the image signals gathered, in addition to the detection of red tail lights, are also able to be utilized, if necessary, to detect traffic signs having typical colors.

Retroactive coloring of pictures is known, for example, from graphics, or from the retroactive processing of old black and white films, retroactive color data being used in each case, that are typically known to an observer, and that are able to be taken over, in automated fashion, in subsequent pictures of a film. It is basically true that color data that are not present are not able to be gathered retroactively, for instance, for coloring black and white pictures.

Japanese document JP 2004304706 A shows a color filter having green, white, red and blue color filter segments, of which the white segments, that are used for a luminescence signal, occupy, chessboard-like, every other matrix position, and the color segments occupy the other remaining half of the matrix positions. In this connection, lines having white and green segments alternate with lines having white, red and blue segments, so that at the corners, each green segment is situated diagonally opposite respectively two blue segments and two red segments. The document also describes an interpolation method for evaluating the image signals that were taken while using such a color mask.

SUMMARY OF THE INVENTION

According to the exemplary embodiments and/or exemplary methods of the present invention, additional color data are derived from the intensity values and color values gathered by the camera. This is based on the idea that the intensity value includes data on all color values, and consequently, when there are present an intensity value and, for instance, only a single color value of close together, particularly adjacent pixels, which thus, at sufficient resolution, refer to a common area, data are able to be ascertained concerning the additional color values. A colored filter pixel of the color mask leads to an attenuation of the spectral light proportion of the other color contents. In the case of a red pixel, it thus leads to an attenuation of the non-red spectral light proportion. By contrast, the intensity pixels are sensitive over the entire spectral range.

To be sure, the additional color values cannot be individually resolved; however, it is recognized, according to the exemplary embodiments and/or exemplary methods of the present invention, that even when applying a mixed color value for the additional colors that are not known, i.e. particularly a complementary value to the known color value, one may already be able to obtain a color vector or a color tuple which may be of assistance both for visualization on a display device and for image processing algorithms. For instance, when there is present an intensity value and a red value, the remaining color proportions may be estimated as a mixed complementary value to red, that is, as a color mixture of green and blue, e.g. turquoise, assuming, first of all, an equally large green value and blue value, and thus a color picture may be regained.

Consequently, according to the exemplary embodiments and/or exemplary methods of the present invention, first of all a detection and differentiation may be performed of traffic signs, traffic lights, tail lights, front lights, brake lights, blinking lights, warning lights and environmental lights, as well as the detection and tracking of objects such as highway users and obstacles.

Thus, in the case of red and transparent filter pixels, first the distinguishability of red and white light sources may be achieved, without having to forfeit sensitivity to any extent, especially for night vision functions. In this connection, distinguishability of red and white light sources is already being achieved, e.g. for vehicle rear and front lights, in the case of a driver assistance camera.

When the mixed color turquoise is applied, it turns out that even at image reproduction, surprisingly good results occur. Furthermore, appropriate driver assistance functions are already able to fulfill various functions using this one additional color value, that is, for example, the turquoise used fictitiously above. It has been shown, for instance, that some traffic signs having a blue background are good to use as a turquoise tone.

Instead of a red filter or a filter having red pixels and transparent intensity pixels, the color filter may also emphasize another spectral proportion, for instance, the green one or the blue one, or even an optionally, spectrally weighted mixture, which may be applied depending on the application.

If a single color filter type is used, the results define a two-dimensional color space, the first dimension being given by the brightness and the second dimension by the color value, for instance, on the red-turquoise axis. Consequently, already substantially more data may be gathered, compared to the usual single dimension of a monochromic camera.

A plurality of color filter types may also be used, according to the exemplary embodiments and/or exemplary methods of the present invention. When using a second color filter type, that is, for example, an additional color filter type in addition to red, there are thus three different kinds of pixels, including the pixels of the transparent filter pixels for the intensity values. Thus, one is able to define a three-dimensional color space, using the dimensions brightness, first color value, second color value.

In general, n different color filter types may be used, in addition to the pixels without color filter, so that the color space resulting from this is consequently n+1-dimensional.

A few additional advantages may be achieved according to the exemplary embodiments and/or exemplary methods of the present invention. In the case of a high-sensitivity resolution having, for instance, only one color filter pixel per three transparent pixels, a spatial resolution approaching a monochromic camera may be achieved. Nevertheless, according to the exemplary embodiments and/or exemplary methods of the present invention, in addition to the directly gathered color data, for instance, the red values, supplementary color data may be obtained concerning the additional color values. Consequently, a color space, having a greater dimension than in response to using a simple monochromic camera, may be created having additional data both for the picture representation and for the image processing algorithms of a vehicle assistance system.

The additional function or the additional method may basically be achieved even purely by software, without additional hardware expenditure, by a corresponding calculation and evaluation, so that the additional costs and the additional effort are low to negligible, and in spite of this, suitable data are able to be gathered.

DETAILED DESCRIPTION

Figure 2:
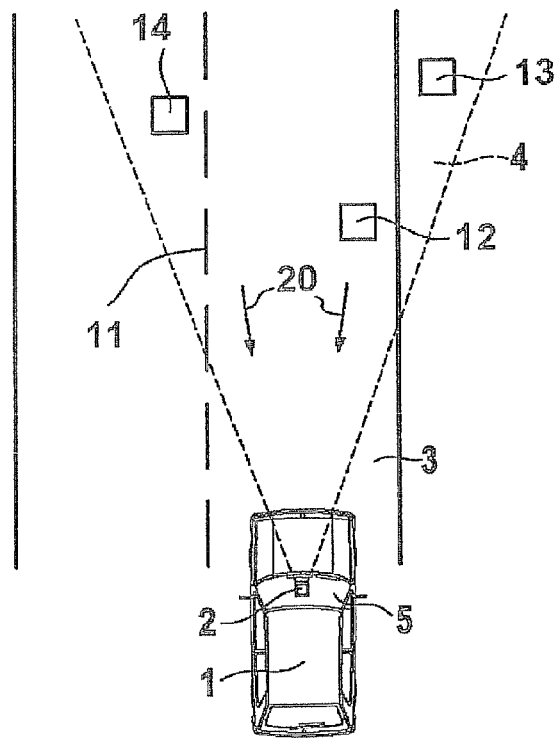
FIG. 2 shows a top view onto a road scene having a vehicle.
Figure 3:
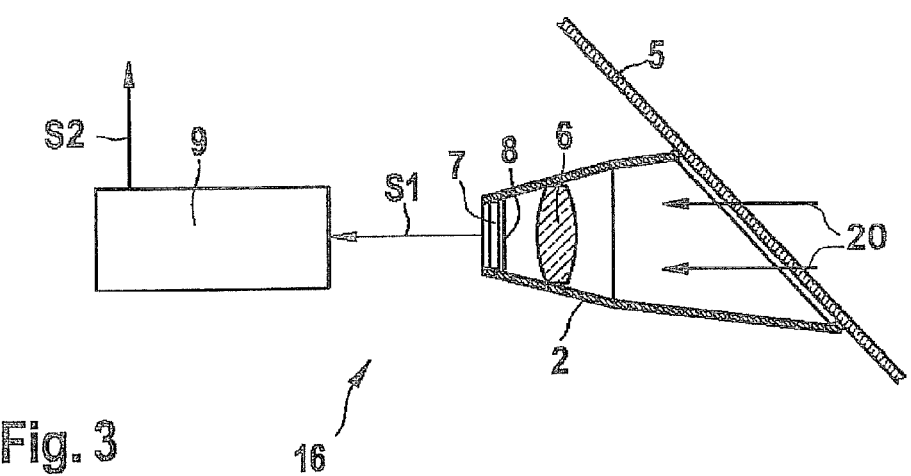
FIG. 3 shows a camera arrangement according to the present invention, having an image sensor and a color mask in a side view, or rather a lateral section.

According to FIG. 2, a vehicle 1, having a camera 2, travels on a roadway 3. Camera 2 is mounted, for instance, behind a vehicle window 5, for example, the windshield, or even in the area of the front or rear bumper of vehicle 1, and takes pictures of a vehicle environment 4 which, for example, essentially represents the road scene ahead of vehicle 1. Consequently, light 20 is recorded by camera 2 which is emitted, for instance, by roadway 3 with its roadway markings 11 and additional objects 12, 13, 14 on or next to roadway 3.

In a manner known per se, camera 2 has camera optics (objective) 6, an image sensor 7 developed as an imager chip, and a color mask 8, which is mounted on image sensor 7. In a manner known per se, image sensor 7 emits first image signals S1 to an evaluation device 9 which, for example, may be a control unit of camera 2. Camera 2 and evaluation device 9 together form a camera set-up 16.

According to the exemplary embodiments and/or exemplary methods of the present invention, first picture signals S1 are processed and second picture signals S2 are formed from this, and they are used for visualizing vehicle environment 4 on a display device in vehicle 1 and/or for processing in picture processing algorithms and recognition algorithms, so as to gain display signals or signals for vehicle intervention.

Figure 1:
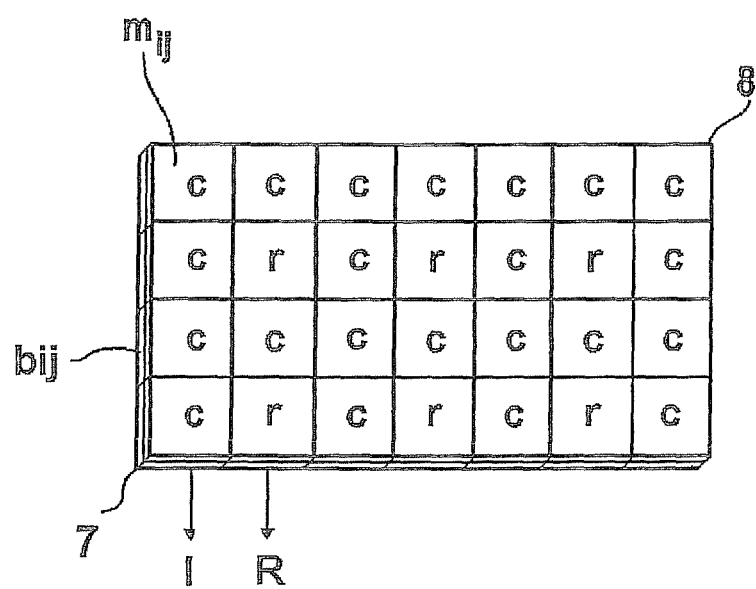
FIG. 1 shows an image sensor having a color mask according to one specific embodiment, in a slightly perspective front view.

FIG. 1 shows a top view onto an image sensor 7 having a color mask (filter mask) 8. Image sensor 7 has a matrix configuration of sensor pixels bij; color mask 8 correspondingly has a matrix configuration of filter pixels $m_{ij}$ which, in this color filter 8 are transparent filter pixels c or red filter pixels r. The red filter pixels are transparent particularly in the red wavelength range, possibly also as far as into the infrared range, and attenuate the non-red spectral light component, i.e. short-wave components of light 20. Transparent filter pixels c are permeable for a broadband component of light 20, which may be in the entire visible spectral range including the red range.

Filter pixels $m_{ij}$ are applied directly in front of corresponding sensor pixels bij of picture sensor 7. Consequently, sensor pixels bij that lie behind a transparent filter pixels c emit an intensity value I, and sensor pixels bij lying between a red filter pixels r emit a red value R, which each represent a scalar quantity.

In the configuration shown in FIG. 1, every fourth filter pixel mij is red, and accordingly, three out of four filter pixels mij are transparent, in this instance, the red filter pixels r themselves, in turn, forming a matrix configuration among themselves or an hypermatrix configuration made up of rows and columns each having a transparent filter pixel c. Instead of the arrangement shown, however, for one thing, there are also other arrangements of colored pixels bij, and other colors than red, and also combinations of transparent filter pixels c having a plurality of colors, such as red, green, blue or even mixed colors are possible. In the configuration shown, having only one type of colored filter pixels r with otherwise transparent filter pixels c, a high-sensitivity resolution comes about, however.

Thus, first of all, distinguishability of red and white light sources is achieved, so that, for example, vehicle tail lights of a preceding vehicle 12 and vehicle front lights of an oncoming vehicle 14 are able to be distinguished using camera 2.

According to the exemplary embodiments and/or exemplary methods of the present invention, for lack of separability of green color value G and blue color value B, G and B are advantageously subsequently applied equally. Consequently, a mixed proportion is formed as turquoise value T, which may first be applied as $T=\frac{1}{2}(G+B)$.

On the assumption of a spectrally white illumination and a linear relationship of illumination and gray-scale value, according to the exemplary embodiments and/or exemplary methods of the present invention, the ratio of red values R, measured using red filter pixels r, and intensity values I, measured using transparent filter pixels c is formed to be $$k = \frac{R}{I}$$

That is, quotient k corresponds to an attenuation, caused by the red filter pixel. k may be in the range of 0.78 to 0.95, and fluctuates especially because of the different composition of the environmental light.

According to the exemplary embodiments and/or exemplary methods of the present invention, approximation vectors Vn are subsequently ascertained as an approximation of the RGB vectors (RGB), which a color camera would have supplied. The following relationship is applied:

$$kI = \frac{R + \beta(G+B)}{1 + 2\beta} = \frac{R + \beta 2T}{1 + 2\beta}$$

In this formula, the factor β stands for a different weighting of the color contributions, no distinction being made between green and blue, and thus only one single variable β having to be applied.

Thus, turquoise value T is yielded as $$T = \frac{kI(1 + 2\beta) - R}{2\beta}$$

According to this equation, turquoise value T is able to be determined as an additional color value, according to the exemplary embodiments and/or exemplary methods of the present invention, from intensity values I and red values R. Consequently, according to the present invention, an approximation vector Vn may be formed having three color values, that is, for example, as RGB vector, in which the green value and the blue value are applied as T, that is, as $$Vn=(R,T,T)$$

This approximation vector may be used directly, an additional functional vector Vv may be formed from it, for instance, a visualization vector Vv having the three RGB components Rv, Gv, Bv for presentation on a display in the vehicle, possibly also for a recognition algorithm, as given by $$Vv=(Rv,Gv,Bv)=cVn=c(R,T,T)$$

Prefactor c may be set to c=1/k, in order to compensate again for the attenuation caused by red filter pixel R.

Consequently, according to the exemplary embodiments and/or exemplary methods of the present invention, second picture signals S2 are generated which include such functional vectors Vv having additional color data, such as turquoise values T in two components, By varying β, a different chrominance may be generated in the pictures. Thus one may represent pictures having colored view by red values and turquoise values. Thus, color tones are yielded along the red-turquoise axis. It may be seen that the pictures yielded by this are surprisingly good, and an observer may, without a problem, perform color differentiations not only between red and the environment, but also in the case of not purely red ranges.

β may, for example, be set to ⅓, that is, a value clearly less than 1. This leads to a higher chrominance and is meaningful since red filter pixel R has only a weak overall attenuation.

In supplement, for contrast improvement, spreading and average value adjustment of the brightness may be performed.

Furthermore, according to the exemplary embodiments and/or exemplary methods of the present invention, it may be taken into account that there may be nonlinearities of the imager chip used as image sensor 7, which are created between the input variable, i.e. the illumination, and the output variable, i.e. the gray-scale value generated. The nonlinearity may occur particularly in the case of overmodulation of image sensor 7. In order to prevent this, according to the exemplary embodiments and/or exemplary methods of the present invention, in all specific embodiments, saturation may be avoided by camera control. In case this is not possible, in all specific embodiments image ranges having saturation may be treated separately. A color reconstruction may then be propagated, for example, from the edge of the saturation range at which there is still just no saturation, into the saturation range.

Moreover, according to the exemplary embodiments and/or exemplary methods of the present invention, nonlinearities may occur which are caused by the camera characteristics curve, that is, the sensitivity of the image sensor and its sensor pixels. In a piece-wise linear camera characteristics curve, the case arises regularly that the intensity pixel lies to the right of a knee-point, while the associated red pixel lies to the left of the knee-point. Because of the different slopes to the left and the right of the knee-point, the distance varies between red value R and intensity value I. Because of this, color distortions may appear, which have a similar effect to the above-mentioned saturation.

In connection with a piece-wise linear camera characteristics curve, it is accordingly advantageous for the color reconstruction to utilize the knowledge of the position of the knee-points and slopes.

According to the exemplary embodiments and/or exemplary methods of the present invention, the color reconstruction is advantageously carried out before additional nonlinearities are introduced, that is, especially by the measures for the image improvement, that is, for example, before histogram imaging, image sharpening and night vision algorithm.

Figure 5:
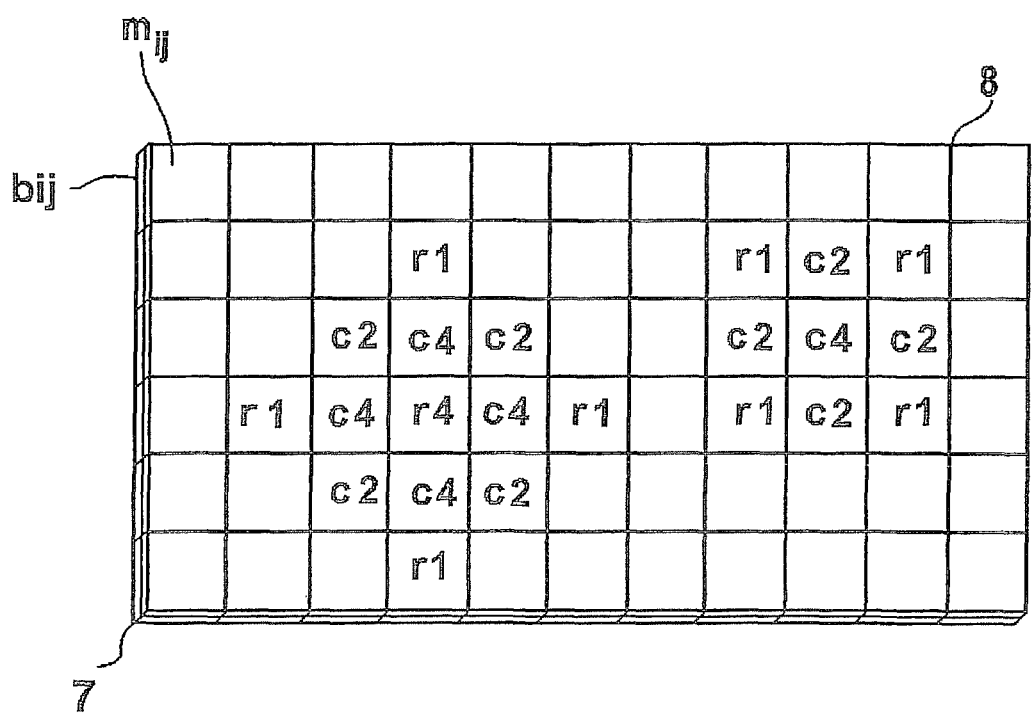
FIG. 5 shows a representation of the arrangement of the weighting factors for an interpolation.

Furthermore, it is recognized, according to the present invention, that the Nyquist scan theorem may be violated by sharply imaging camera 2, and consequently, aliasing effects may occur. For this, low-pass filtering may be carried out, for one thing. On this matter, FIG. 5 shows two examples of interpolation, which enable a reconstruction of the color values in half resolution compared to the original resolution. In this instance, in addition to the statement of the transmission behavior of the filter pixels, that is, as in FIG. 1 statement c for transparent filter pixels and r for red filter pixels, the weighting factors for the respective pixels, in this case the values 1, 2 and 4 are written in. Thus, the two examples enable the reconstruction both of red filter pixels r (red pixels) and transparent filter pixels c (intensity pixels), in these examples each red filter pixel r and each transparent filter pixel c going into the end results having the same weight overall.

According to the exemplary embodiments and/or exemplary methods of the present invention, however, it is also recognized that the aliasing effects may be reduced by a post-connected low-pass filtering of image signals S1, but possibly cannot be completely removed. This aliasing may occur particularly in the case of distant, and thus point-shaped red tail lights in an image, and possibly in traffic lights which may possibly be recorded only by one single filter pixel $m_{ij}$, and thus, depending on their position, may appear sometimes red and sometimes white. Consequently, a point-shaped red light source, which falls in a durable manner only on transparent color pixels, may possibly remain undetected as such for a long time.

According to the exemplary embodiments and/or exemplary methods of the present invention, the possibility is created, for this purpose, of deliberately defocussing camera 2 with camera optics 6 and image sensor 7, for instance, by defocussing camera optics 6 on a distance beyond infinity. Thus, all objects 12, 13, 14 are taken in unsharpness. In this respect, in the case of far distant objects, such as traffic signs, roadway markings and pedestrians, the defocussing has the least effect, so that the ability to detect them remains ensured. In this connection, one may recognize that, in the case of nearby objects 12, a slight unsharpness is unimportant anyway.

Figure 4:
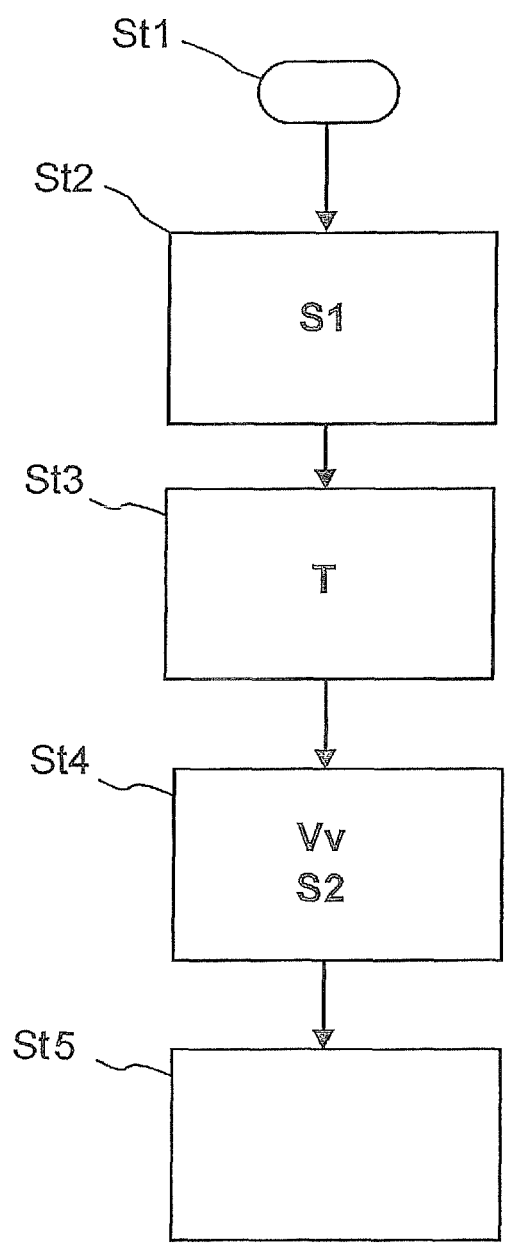
FIG. 4 shows a flow chart of a method according to the present invention.

Thus, the method according to the present invention, as in FIG. 4, begins in step St1 when camera 2 is put into operation. Subsequently, in step St2, vehicle environment 4 is recorded by camera 2, and image signals S1 are emitted to evaluation device 9, which, according to step St3, ascertains from intensity values I and first color values, that is, red values R, adjacent filter pixels $m_{ij}$, turquoise values T, according to the abovementioned calculation, whereupon in step St4, the functional vectors, for instance, visualization vectors Vv according to the abovementioned calculation i are ascertained and are output in second image signals St2, in order perhaps subsequently, in step St5, to carry out a representation of visualization vectors Vv on a display device and/or carry out an additional processing by a detection algorithm.

What is claimed is:

1. A camera set-up, comprising:
a camera having camera optics, an image sensor for recording an environment and for outputting first image signals, and a color mask applied in front of image sensor; and
an evaluation device, which picks up the first image signals emitted by the image sensor, the image sensor having a plurality of sensor pixels and the color mask having a plurality of filter pixels which are each situated in front of the sensor pixels and include first colored filter pixels and transparent filter pixels;
wherein some of the sensor pixels pick up light via the colored filter pixels and output first color values, and additional sensor pixels pick up light via the transparent filter pixels and emitting intensity values;
wherein the evaluation device ascertains second color values from the intensity values and the first color values of various sensor pixels, and ascertains second image signals from the first color values and the second color values;
wherein the evaluation device ascertains the second color value as a complementary value to the first color value, using at least one intensity value and a first color value, and an attenuation which is determined by a ratio of the first color value to the intensity value;
wherein the second color is a mix of two other colors besides the first color; and
wherein color in the second image signals is represented using the first color value and the second color value in proportion to each other.

2. The camera set-up of claim 1, wherein the first colored filter pixels are transparent only for a sub-range of the visible light, which includes a red wavelength range, and have an attenuation for other spectral ranges, and the transparent filter pixels are transparent for the entire spectral range of the visible light.

3. The camera of claim 1, wherein the color mask has only transparent filter pixels and first colored filter pixels of a single color.

4. The camera of claim 3, wherein the colored filter pixels are red filter pixels, approximately every fourth filter pixel being red and the additional filter pixels are transparent.

5. The camera set-up of claim 1, wherein the camera optics are defocussed on an object distance greater than infinity.

6. The camera set-up of claim 1, wherein the evaluation device ascertains approximation vectors, from the first color values and the second color values, each approximation vector having at least three components, which are formed from the first color values and the second color values, and the evaluation device forms the second image signals using the approximation vectors.

7. The camera set-up of claim 6, wherein each of the approximation vectors includes a first component obtained from the first color values and at least two additional components obtained from the ascertained second color values.

8. The camera set-up of claim 7, wherein the evaluation device ascertains a functional vector by scaling one of the approximation vectors using a prefactor, which is ascertained as a function of an attenuation, which is given by the ratio of a first color value to an intensity value.

9. The camera set-up of claim 6, wherein the approximation vectors are RGB vectors in which components corresponding to the two other colors are represented using the second color values.

10. The camera of claim 1, wherein the camera is a vehicle camera for recording a vehicle environment, and the evaluation device outputs the visualization vectors to be represented at least one of on an internal vehicle display device and for a vehicle assistance function.

11. The camera set-up of claim 1, wherein the evaluation device ascertains the second color value using a weighting factor that specifies a color contribution of the two other colors.

12. A method for ascertaining image signals having color values, the method comprising:
recording an environment using an image sensor, the image sensor having a plurality of sensor pixels, which pick up light via filter pixels having different transmission properties, of which the colored filter pixels let the light over a narrow wavelength range pass through, and the transparent filter pixels let the light over a wide wavelength range pass through which at least partially includes the narrow wavelength range;
ascertaining a first image signal, wherein some of the sensor pixels pick up the light via the colored filter pixels and output first color values, and additional sensor pixels pick up the light via the transparent filter pixels and output intensity values;
ascertaining second color values from the intensity values and the first color values of various sensor pixels; and
ascertaining second image signals using the first color values and the second color values;
wherein the second color value, as a complementary value to the first color value, is ascertained using at least one intensity value and a first color value, and an attenuation, which is determined by a ratio of the first color value to the intensity value;
wherein the second color is a mix of two other colors besides the first color; and
wherein color in the second image signals is represented using the first color value and the second color value in proportion to each other.

13. The method of claim 12, wherein approximation vectors are ascertained from the first color values and the second color values, each approximation vector having at least three components, which are formed from the first color values and the second color values, and the second image signals are formed using the approximation vectors.

14. The method of claim 13, wherein each of the approximation vectors includes a first component obtained from the first color values and at least two additional components obtained from the ascertained second color values.

15. The method of claim 14, wherein a functional vector is ascertained by scaling one of the approximation vectors using a prefactor, which is ascertained as a function of an attenuation, which is given by the ratio of a first color value to an intensity value.

16. The method of claim 13, wherein the approximation vectors are RGB vectors in which components corresponding to the two other colors are represented using the second color values.

17. The method of claim 12, wherein the first color values and the intensity values of adjacent sensor pixels are used to ascertain the second color values.

18. The method of claim 12, wherein the second color value is ascertained using a weighting factor that specifies a color contribution of the two other colors.

19. A method for ascertaining image signals having color values, the method comprising:
  recording an environment using an image sensor, the image sensor having a plurality of sensor pixels, which pick up light via filter pixels having different transmission properties, of which colored filter pixels let the light over a narrow wavelength range pass through, and transparent filter pixels let the light over a wide wavelength range pass through which at least partially includes the narrow wavelength range;
  ascertaining a first image signal, wherein some of the sensor pixels pick up the light via the colored filter pixels and output first color values, and additional sensor pixels pick up the light via the transparent filter pixels and output intensity values;
  ascertaining second color values from the intensity values and the first color values of various sensor pixels; and
  ascertaining second image signals using the first color values and the second color values;
  wherein approximation vectors are ascertained from the first color values and the second color values, each approximation vector having at least three components, which are formed from the first color values and the second color values, and the second image signals are formed using the approximation vectors;
  wherein each of the approximation vectors includes a first component obtained from the first color values and at least two additional components obtained from the ascertained second color values;
  wherein a functional vector is ascertained by scaling one of the approximation vectors using a prefactor, which is ascertained as a function of an attenuation, which is given by the ratio of a first color value to an intensity value; and
  wherein the second color value is ascertained from the equation $$T = \frac{kI(1 + 2\beta) - R}{2\beta}$$

where T=the second color value, I=the intensity value, k=the attenuation and $\beta$ is the weighting factor for weighting the second color value T.

* * * * *